UNITED STATES PATENT OFFICE.

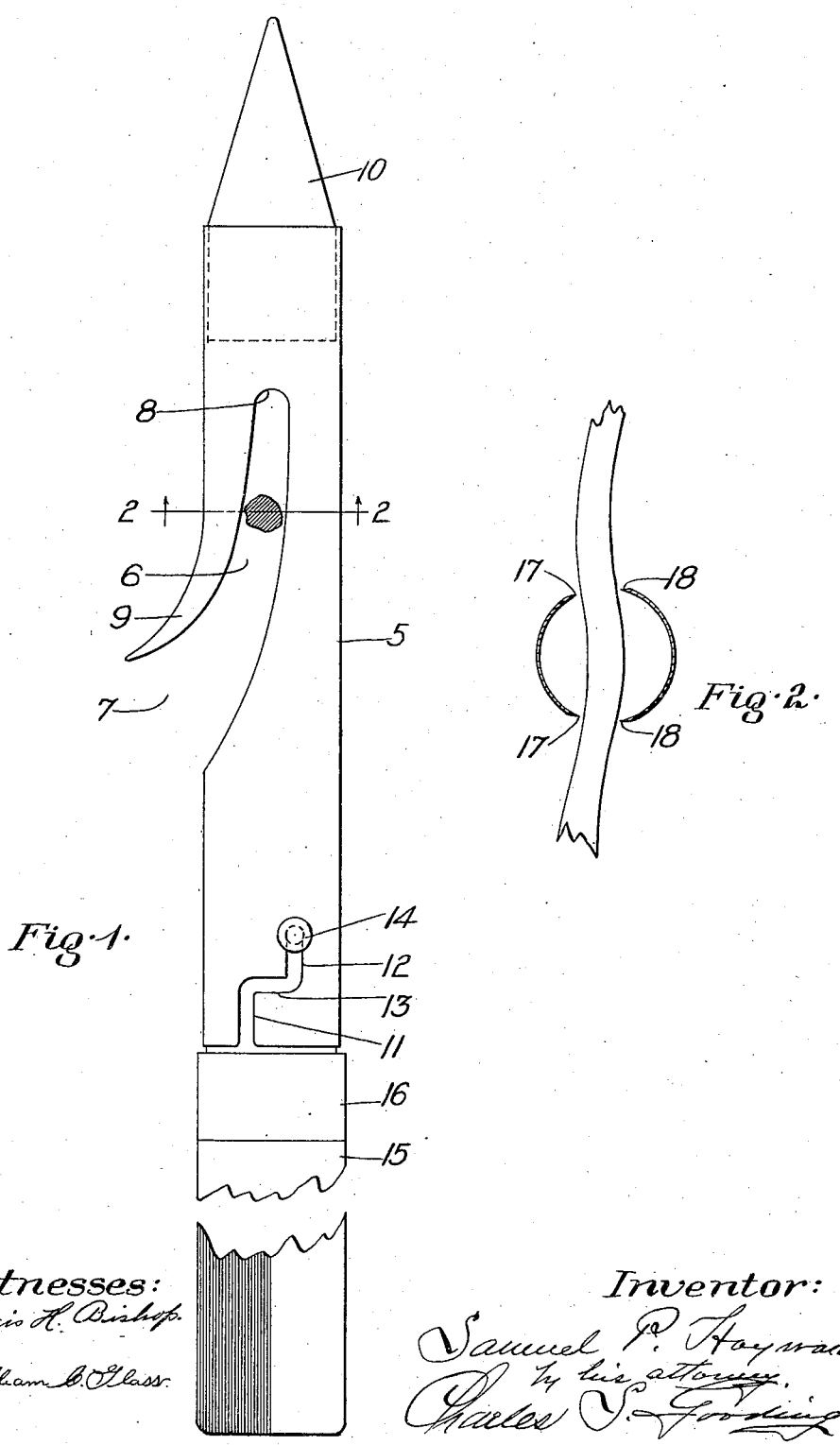

SAMUEL P. HAYWARD, OF EAST PEPPERELL, MASSACHUSETTS.

PRUNING INSTRUMENT.

No. 888,495.    Specification of Letters Patent.    Patented May 26, 1908.

Application filed July 3, 1907. Serial No. 381,991.

*To all whom it may concern:*

Be it known that I, SAMUEL P. HAYWARD, a citizen of the United States, residing at East Pepperell, in the county of Middlesex and State of Massachusetts, have invented new and useful Improvements in Pruning Instruments, of which the following is a specification.

This invention relates to improvements in pruning instruments for removing moths' nests from the branches of trees, and the object is to provide a device by means of which a person standing on the ground or other convenient place can readily remove the moths' nest by cutting off the twigs on which the nests are supported.

The invention consists in the combination and arrangement of parts set forth in the following specification and particularly pointed out in the appended claims.

Referring to the drawings: Figure 1 is a side elevation of the device, the handle being partly broken away to save space in the drawings, there being a twig shown in section in the slot. Fig. 2 is a detail section taken on line 2—2 of Fig. 1.

Like numerals refer to like parts throughout the several views of the drawings.

In the drawings, 5 is a tube provided with a slot 6 extending through the opposite walls of said tube, said slot having an open end 7 and a closed end 8 located above said open end. The edges of the slot 6 preferably converge toward the upper end thereof. The metal above and adjacent to the open end 7 is bent outwardly to form a hook 9. A tip 10 which is preferably conical in form is secured in the upper end of the tube 5. The tube 5 is provided with two vertical slots 11 and 12 connected by a circumferential slot 13, said slot 11 extending through the lower end of said tube. A pin 14 which is shown located in the slot 12 is fast to a pole or handle 15, it being understood that the upper end of said pole extends into the tube 5 and the pin 14 forms the means of attachment to said pole. The pole 15 may, if desired, be provided with a ferrule 16.

When it is desired to remove the tube 5 from the pole 15, said tube is grasped and moved upwardly with relation to said pole until the pin 14 is in alinement with the slot 13. The tube 5 is then rotated until the pin 14 is in alinement with the slot 11 and then the tube 5 is drawn upwardly until the pin 14 passes out of the slot 11.

The opposite edges 17 and 18 of the slot 6 are sharpened and constitute cutting edges which may be readily sharpened from time to time either with a file or by means of a grinding wheel.

The operation of the device is as follows: The tube 5 is moved upwardly among the branches of the tree and the hook 9 is brought down upon the twig or small branch which bears moths' nests. The tube 5 is then pulled downwardly until the branch or twig contacts with the cutting edges 17 and 18 and the tube is then rotated in either direction as may be convenient and the branch is thereby severed. In order that the operator may be able to tell which side of the tube the hook 9 is on while the tube is partly hidden by the branches, the pole 5 is preferably provided with a suitable mark on that side of the pole, such, for instance, as bright colored paint.

Having thus described my invention, what I claim and desire by Letters Patent to secure is:

1. In a pruning instrument, a tube provided with a slot having a lateral open end and a closed end located above said open end, and a pole secured to the lower end of said tube.

2. In a pruning instrument, a tube provided with a slot having a lateral open end and a closed end located above said open end, said open end being greater in width than said closed end, and a pole secured to the lower end of said tube.

3. In a pruning instrument, a tube provided with a slot having a lateral open end and a closed end located above said open end, the metal above and adjacent to said open end being bent outwardly to form a hook.

4. In a pruning instrument, a tube provided with a slot having a lateral open end and a closed end located above said open end, the metal above and adjacent to said open end being bent outwardly to form a hook, and a substantially conical tip on the upper end of said tube.

5. In a pruning instrument, a tube provided with a slot having a closed end and a lateral open end, said tube also provided with two slots extending longitudinally thereof and a circumferential slot connecting said longitudinal slots, one of said longitudinal slots extending through the lower end of said tube; a pole located on the lower end of said tube, and a pin fast to said pole and adapted to enter said slots.

In testimony whereof I have hereunto set my hand in presence of two subscribing witnesses.

SAMUEL P. HAYWARD.

Witnesses:
LOUIS A. JONES,
SADIE V. MCCARTHY.